Figure 1:
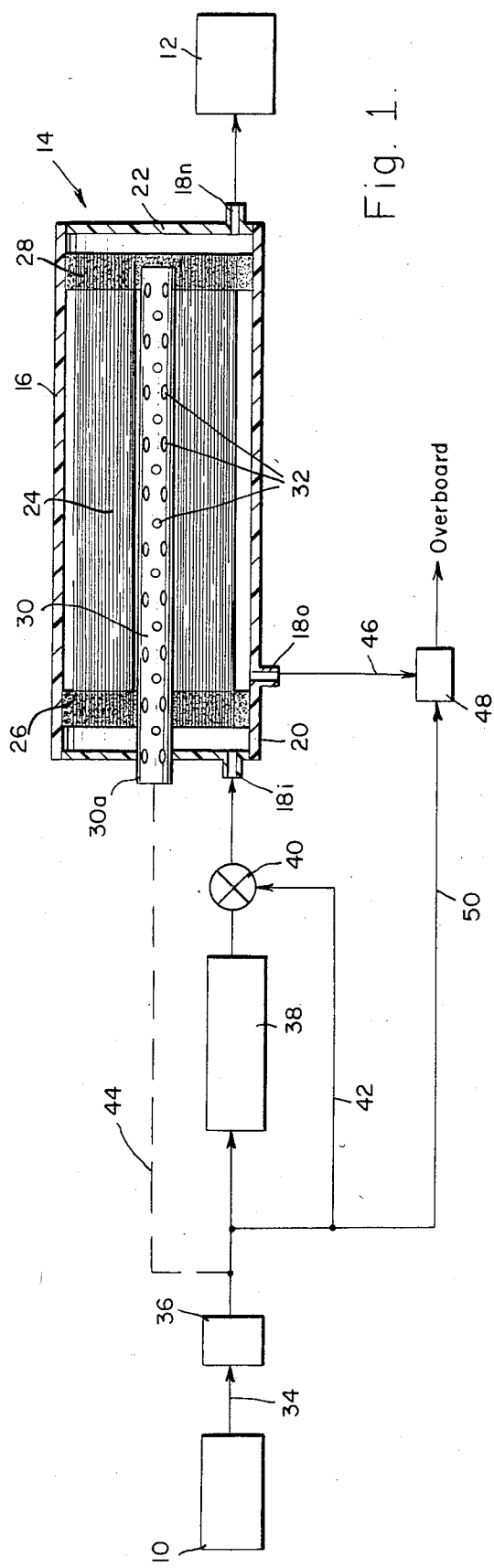

United States Patent [19]

Manatt

[11] Patent Number: 4,556,180
[45] Date of Patent: Dec. 3, 1985

[54] FUEL TANK INERTING SYSTEM

[75] Inventor: Scott A. Manatt, Granada Hills, Calif.

[73] Assignee: The Garrett Corporation, Los Angeles, Calif.

[21] Appl. No.: 967,668

[22] Filed: Dec. 7, 1978

[51] Int. Cl.⁴ .............................................. B64D 37/32
[52] U.S. Cl. .................................. 244/135 R; 55/158
[58] Field of Search ................. 244/135 R; 55/20, 66, 55/158, 385 R, 431, 468, 267; 220/88 B

[56] References Cited

U.S. PATENT DOCUMENTS

| | | | |
|---|---|---|---|
| 2,889,955 | 6/1959 | Naulty et al. | 244/135 R |
| 2,923,288 | 2/1960 | Burtt | 244/135 R |
| 3,165,390 | 1/1965 | Parken et al. | 55/431 |
| 3,350,844 | 11/1967 | Robb . | |
| 3,442,002 | 5/1969 | Geary et al. | 55/158 |
| 3,691,730 | 9/1972 | Hickey et al. | 244/135 R |
| 3,735,558 | 5/1973 | Skarstrom et al. | 55/158 |
| 4,140,499 | 2/1979 | Ozaki et al. | 55/158 |

Primary Examiner—Trygve M. Blix
Assistant Examiner—Rodney Corl
Attorney, Agent, or Firm—Joel D. Talcott; James W. McFarland; Albert J. Miller

[57] ABSTRACT

A pump is used to exhaust oxygen rich waste gas to ambient pressure in an inert gas generating system in order to improve the performance of the permeable membrane air separator component and to insure sufficient generation of inert gas when available source air pressure is low.

10 Claims, 2 Drawing Figures

FUEL TANK INERTING SYSTEM

The Government has rights in this invention pursuant to Contract Number DAAJ02-76-C-0073 awarded by the Department of the Army.

This invention relates to fuel tank inerting systems and, more particularly, to an inert gas generation system wherein a nitrogen enriched, oxygen depleted stream is produced by an air separation module.

It is well known that although fuel vapors may be present, flame propagation and a possible resultant explosion in an enclosed volume, such as a fuel tank or adjacent dry bay area, will not occur unless a sufficient amount of oxygen is present. A threat of explosion does generally exist in the fuel tank in vehicles because fuel tank venting causes fuel vapor to be mixed with ambient air having about a 21% concentration of oxygen.

It has been determined that if the oxygen concentration in the fuel tank can be maintained at a level of about 9% or less, the threat of explosion occurring as a result of the generation of an ignition source can be substantially reduced. Some vehicles, principally military aircraft have been equipped with fuel tank inerting systems which provide a supply of nitrogen, or nitrogen enriched gas, to fill the empty space or ullage which is created in the fuel tanks as a result of fuel use.

Of available types of fuel tank inerting systems, the most desirable from a weight, capacity and ground service requirements stand points in the Inert Gas Generation System which utilizes pressurized air supplied by engine bleed from a gas turbine engine or other airborne source of pressurized air. This air is separated into an oxygen rich component, which is exhausted overboard, and an oxygen depleted component, the inert gas, which is fed to the fuel tank.

The size and weight of the permeable membrane air separation modules, usually the most substantial component in an inert gas generation system, can be reduced by increasing source air pressure and by increasing feed/exhaust pressure ratio, within the structural limits of the membrane materials. Generally, low source air pressure can be increased by means of a mechanically, pneumatically, hydraulically or electrically driven boost compressor to improve the air separation module's pressure ratio and increase the pressure gradient across the membrane separation surface.

Another means of improving air separation module performance is the use of wash air to prevent the buildup of oxygen partial pressure on the exhaust side of the membrane surface. In this type of system, two streams of pressurized air are used. One stream is fed to one side of the membrane surface so that the higher permeability oxygen can preferentially permeate through the membrane surface while the lower permeability nitrogen preferentially remains in the pressurized stream. The other air stream is fed to the opposite surface of the membrane and is used to provide a wash to remove the oxygen enriched air so that a high rate of separation may be maintained.

In some applications, although air may be supplied at a low pressure, the added weight, size and energy penalties associated with the addition of a boost compressor is not justified by the reduction in the size and weight penalties of the air separation modules which would result. One example of this application is the gas turbine driven military helicopter.

In accordance with this invention, a fuel tank inerting system utilizes a permeable membrane air separation module which may be operated with the use of lower pressure air and, if desired, with reduction or elimination of the wash air. A jet pump or other type of pump is positioned to receive the oxygen enriched stream. The jet pump may be powered by a small amount of pressurized air, and serves the dual purpose of drawing the oxygen enriched stream to ambient while reducing the exhaust pressure in the air separation module and maintaining a sufficiently high pressure differential across the membrane to permit separation at a sufficient rate to maintain output oxygen concentration at less than 9% $O_2$.

Figure 2:
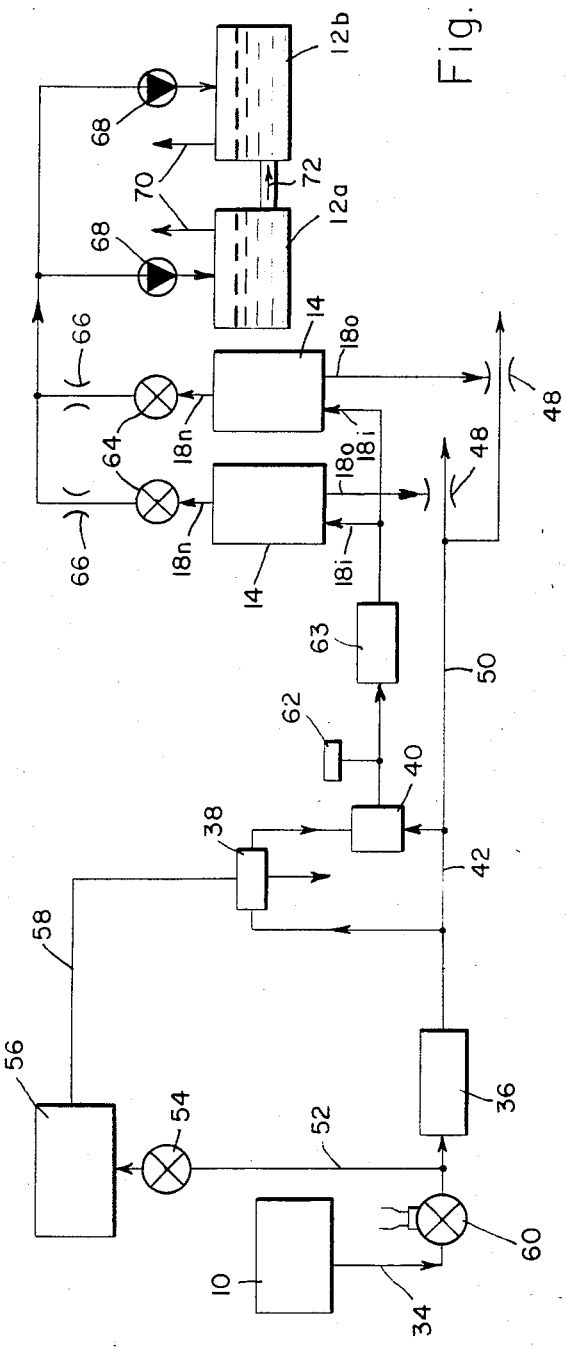

The advantages of this invention will be more readily evident when the following specification is read in conjunction with the appended drawings, wherein:

FIG. 1 is a general schematic diagram of a simplified fuel tank inerting system in accordance with this invention with an air separation module thereof shown in cross section; and FIG. 2 is a generally schematic diagram illustrating an alternate embodiment of the fuel tank inerting system of this invention.

Referring now to the drawings, FIG. 1 illustrates a basic system which may be utilized to illustrate the features of the present invention and highlight the distinctions over the prior art.

The function of a fuel tank inerting system is to receive pressurized air having an oxygen concentration of about 21% from a propulsion engine, a separate compressor, or other on-board source 10 of pressurized air, and separate the air into an oxygen rich stream which is exhausted overboard, or further processed for other useful on-board applications, and an oxygen depleted stream preferably having an oxygen concentration less than 9%, which is fed to an enclosed volume, such as a void space volume or a fuel tank 12. The most critical component of such a system is in air separation module 14, a typical unit being illustrated in cross section.

The air separation module 14 has a housing 16 which may be of any suitable shape and constructed of any material suitable for airtight construction. In the preferred embodiment, a cylindrical housing combines simple, low cost construction with light weight suitable for airborne vehicles. Three major openings in the housing 16 provide for airflow in the module 14. An input opening 18$i$ receives pressurized, ambient concentration air into a plenum chamber 20. Opening 18$n$ receives the nitrogen rich (oxygen depleted) inert gas stream from a plenum chamber 22 to be fed to the fuel tank 12. Opening 18$o$ receives the oxygen rich stream to be exhausted overboard.

The separation of air into enriched streams involves the use of a polymeric membrane surface which in the preferred embodiment are in the form of a collection of extremely small diameter, filament-like hollow fibers 24 although other structural membrane forms may be utilized. The fibers are made of methylpentene polymer, a raw material manufactured by Matsui of Japan and fabricated into hollow fibers by Dow Chemical Company. The fibers 24 are held within the housing 16 with their ends molded into suitable sealing blocks 26 and 28 which are then positioned in sealing relationship to form one wall of the input plenum 20 and output plenum 22, respectively. Flow out of plenum 20 and into plenum 22 can only be through the ends of the fibers 24. The walls of the hollow fibers are the membrane surfaces. When a gas mixture such as air is introduced into the input plenum 20, it flows into one end of membrane fiber bundle and flows within the hollow fibers. Due to different membrane permeability rates of oxygen and nitrogen, as the gas flows within the fibers, the high pressure gas becomes depleted of oxygen, the component having a higher coefficient of permeability. This oxygen enriched air permeates through the follow fiber membrane walls and is withdrawn through opening 18o. The remaining gas flowing within the hollow fibers to the output plenum 22 thus becomes enriched in nitrogen and exits through the opening 18n to the fuel tank 12.

If increased oxygen gas partial pressure is allowed to exist within the housing 16 adjacent to fibers 24, this will reduce the tendency of oxygen within the fibers 24 to permeate through the walls and the oxygen percentage in the gas entering the output plenum 22 will tend to become undesirably increased. It is known in the art to prevent this problem by use of a tube 30 to provide a wash for the fibers 24. As illustrated, the tube 30 may be inserted through one end of the housing 16 and mounted in the sealing blocks 26 and 28. Additional air is fed through an end portion 30a of the tube and flows through a plurality of openings 32 to speed the departure of oxygen enriched gas from the air separation module 14 through opening 18o thereby reducing the partial pressure of the oxygen in the exhaust product.

Air from the source 10 is fed by suitable conduit 34 through a filter 36, a heat exchanger 38 and a mixing valve 40. The filter 36 removes any particulate matter which might otherwise cause clogging of the fibers 24. The heat exchanger 38 cools the bleed air to a temperature desirable for optimum operation of the air separation module. This would generally be on the order of 50°–100° F. Cooling for the heat exchanger 38 may be provided by ram or fan driven air and may be supplemented by cooling air from an environmental control system if a sufficient supply of ram air is unavailable or at an elevated temperature. The mixing valve 40 mixes air from the heat exchanger with bypass air fed through a conduit 42 to prevent too great a decrease in air temperature when ambient temperatures are below the desired operating temperature.

If sufficient bleed air is available and a pressurized wash of the fibers 24 is desired, bleed air may be fed through the tube 30 via a conduit 44, preferably connected to the conduit 34 downstream of the filter 36. If such a wash is either infeasible or undesired, the tube 30 may be omitted from construction of the air separation module 14. Alternately, end portion 30a of the tube 30 may be connected in parallel with or in lieu of exhaust port 18o to permit a standard module containing such a tube to be utilized while producing a further reduction in exhaust pressures. An additional advantage in use of the tube 30 is derived from additional structural integrity between sealing blocks 26 and 28.

Whether or not such a wash is utilized, oxygen rich air may be drawn from the housing 16 by connecting opening 18o of the air separation module 14 by a conduit 46 to a jet pump 48. The jet pump is operated by pressurized air preferably received via a conduit 50 connected to conduit 34 downstream of the filter 36. As is well-known, a jet pump utilizes the flow of a stream of air through a venturi to create a high speed, low pressure flow of air which may then be connected to receive flow from a higher pressure source, thus serving as a pump. This pump can draw the oxygen enriched air from the housing 16 and maintain a sufficient pressure drop across the membrane of the fibers 24 to provide highly efficient operation of the air separation module 14 with the use of only a limited wash through tube 30 or no wash at all.

A preferred embodiment of the fuel tank inerting system of this invention for use in a helicopter having a limited supply of bleed air is demonstrated in FIG. 2 wherein reference numerals previously utilized in the description of FIG. 1 has been retained for the same system components.

As before, bleed air from the engine 10 is supplied through conduit 34 to filter 36 for removal of particular material. A conduit 52 may feed bleed air from the engine 10 through a suitable valve 54 to an environmental control unit (ECU) 56 which provides cool pressurized air for cooling and pressurization of personnel occupied portions of the helicopter. The ECU 56 provides cooling air through conduit 58 to the heat exchanger 38 which removes heat from the airstream prior to its use for cabin cooling. Alternately, ambient temperature air may be used as the source of bleed air cooling in heat exchanger 38 or may be used prior to final cooling by ECU air. A suitable shutoff valve 60 is interposed in conduit 34 upstream of the filter 36 to provide the option to terminate operation of the fuel tank inerting system under conditions requiring availability of maximum engine power. This is particularly required in military aircraft.

Flow through the heat exchanger 38 and bypass conduit 42 are merged in the mixing valve 40 which controls the temperature of airflow through a pair of air separation modules 14 in response to feedback from a temperature control sensor 62 positioned downstream of the valve 40 and through a pressure limiting regulator 63.

The air enters one or more air separation modules 14 through openings 18i for separation into oxygen rich and nitrogen rich streams. The nitrogen rich streams exit through opening 18n and passes through flow regulators 64 which control the flow of oxygen depleted air to the fuel tanks and venturies 66 for regulating pressure of the flow. The gas is then fed to the fuel tanks 12a and 12b through check valves 68 which prevent venting of fuel vapor back into the inert gas generating system. The tanks are preferably connected to atmosphere by suitable vents 70 which may be interconnected, and may be connected to each other by a fuel pipe 72 to adjust weight balance between the tanks.

As the quantity of fuel in the tanks 12a and 12b decreases, a flow of gas from the air separation modules having less than 9% oxygen concentration enters the ullage of the tanks in lieu of ambient air so that the explosion hazard on impact or resulting from the occurrence of an ignition source such as incendiary bullets during combat is significantly reduced. Additionally, gas must be supplied to the tanks upon any decrease in altitude for repressurization of the tanks as required by the change of ambient pressure. Reduction in pressure during increases in altitude and exhaust of excess flow during level flight are accommodated by the vents 70.

The oxygen rich streams are drawn from the air separation modules 14 through openings 18o by the operation of jet pumps 48 which receive a small supply of bleed air through conduit 50 and pump the oxygen rich stream overboard, maintaining high efficiency of the air supply module by preventing oxygen build up on the downstream side of the membrane and maintaining an adequate pressure drop across the membrane.

Through operation of the fuel tank inerting system of this invention, adequate supplies of nitrogen rich, oxygen depleted gas may be provided to the fuel tanks of an aircraft having a low supply pressure of available bleed air such that a high degree of protection against fuel explosion may be maintained without significant draining of engine power required by prior art systems.

I claim:

1. A fuel tank inerting system for an enclosed volume in a helicopter having a turbine engine for producing bleed air, said system comprising:

separating means including tubular membranes having walls within a housing, inlet means for feeding air into a first end of said tubular membranes, first outlet means for passing gas from a second end of said tubular membranes, and second outlet means for passing gas passed through said tubular membrane walls;

means for feeding engine bleed air to said inlet means such that oxygen depleted gas is passed from said first outlet means and oxygen enriched gas is passed from said second outlet means;

means for feeding oxygen depleted gas from said first outlet means to said enclosed volume for preventing gas in said enclosed volume from attaining an oxygen concentration greater than about 9%;

jet pump means;

means for feeding engine bleed air to said jet pump for creating a low pressure stream exhausted overboard; and means for connecting said jet pump low pressure stream to said second outlet means for exhausting said oxygen enriched gas overboard and maintaining a predetermined pressure differential across said tubular membrane walls.

2. The system of claim 1 additionally including wash means for feeding engine bleed air into said separating means housing outside said tubular membrane walls to help propel said oxygen enriched gas through said second means.

3. A system for limiting oxygen concentration in an enclosed volume wherein flammable vapors may be contained, said system comprising:

a source of pressurized air;

separating means for receiving the pressurized air and producing an oxygen depleted portion and an other portion in relation to a pressure differential across said separating means;

means for feeding the oxygen depleted portion to said enclosed volume;

jet pump means withdrawing the other portion from said separating means to be exhausted for increasing said pressure differential;

means for supplying pressurized air for operating said jet pump means; and means for controlling temperature of the pressurized air received by said separating means, comprising:

a first flow path for said pressurized air; a second flow path for said pressurized air including heat exchanger means;

sensor means for producing an output corresponding to the temperature of air received by said separating means; and valve means for receiving air from said first and second flow paths and mixing said air in proportion responsive to said sensor means output.

4. An inerting system for an enclosed volume in an aircraft having a limited supply pressure of pressurized air, said system comprising:

a source of pressurized air;

separating means for receiving the pressurized air and producing an oxygen depleted portion and an other portion in relation to a pressure differential across said separating means, said separating means comprising a housing containing tubular membranes having walls for receiving pressurized air therein and passing said other portion through said walls;

means for feeding the oxygen depleted portion to said enclosed volume;

jet pump means receiving pressurized air and withdrawing the other portion of air from said separating means to be exhausted for increasing said pressure differential and maintaining a predetermined pressure differential across said tubular membrane walls; and means for controlling temperature of the pressurized air received by said separating means, comprising:

a first flow path for said pressurized air;

a second flow path for said pressurized air including heat exchanger means;

sensor means for producing an output corresponding to the temperature of air received by said separating means; and valve means receiving air from said first and second flow paths and mixing said air in proportion responsive to said sensor means output.

5. The system of claim 4 additionally including wash means for feeding pressurized air into said housing outside said tubular membranes.

6. The system of claim 4 wherein said oxygen depleted portion contains less than 9% oxygen.

7. The system of claim 4 wherein said aircraft has environmental control means for producing cooled air and including means for supplying cooled air from said environmental control means for removing heat from said heat exchanger.

8. The system of claim 7 wherein said aircraft is a helicopter.

9. The system of claim 8 wherein said helicopter has a turbine engine and said source of pressurized air comprises bleed air from said engine.

10. The system of claim 4 wherein said aircraft is an airplane and including means for supplying ram air for removing heat from said heat exchanger.

* * * * *